(12) United States Patent
Park

(10) Patent No.: US 11,254,303 B2
(45) Date of Patent: Feb. 22, 2022

(54) HYBRID VEHICLE AND METHOD OF CONTROLLING GEAR SHIFTING FOR THE SAME

(71) Applicants: Hyundai Motor Company, Seoul (KR); Kia Motors Corporation, Seoul (KR)

(72) Inventor: Joon Young Park, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/092,802

(22) Filed: Nov. 9, 2020

(65) Prior Publication Data

US 2021/0171011 A1    Jun. 10, 2021

(30) Foreign Application Priority Data

Dec. 10, 2019   (KR) ................ 10-2019-0163353

(51) Int. Cl.
*B60W 20/15* (2016.01)
*B60W 10/08* (2006.01)
*B60W 10/11* (2012.01)
*B60W 10/06* (2006.01)
*B60W 20/13* (2016.01)
*B60K 6/36* (2007.10)
*B60K 6/26* (2007.10)
(Continued)

(52) U.S. Cl.
CPC .............. *B60W 20/15* (2016.01); *B60K 6/24* (2013.01); *B60K 6/26* (2013.01); *B60K 6/28* (2013.01); *B60K 6/36* (2013.01); *B60W 10/06* (2013.01); *B60W 10/08* (2013.01); *B60W 10/11* (2013.01); *B60W 20/13* (2016.01); *B60W 50/0097* (2013.01); *B60W 2510/083* (2013.01); *B60W 2510/242* (2013.01); *B60W 2520/10* (2013.01); *B60W 2530/00* (2013.01); *B60Y 2200/92* (2013.01); *B60Y 2300/43* (2013.01); *B60Y 2300/60* (2013.01); *B60Y 2300/70* (2013.01); *B60Y 2400/112* (2013.01); *B60Y 2400/303* (2013.01); *B60Y 2400/70* (2013.01)

(58) Field of Classification Search
None
See application file for complete search history.

(56) References Cited

U.S. PATENT DOCUMENTS 10,717,427 B2 * 7/2020 Park .................. B60W 20/30
11,110,908 B2 * 9/2021 Lee .................... B60K 6/442

* cited by examiner

*Primary Examiner* — Dirk Wright
(74) *Attorney, Agent, or Firm* — Slater Matsil, LLP

(57) ABSTRACT

A method of controlling gear shifting of a hybrid vehicle including an engine, a motor, and a stepped transmission includes predicting a requested torque reduction amount requested by the engine and the motor when there is a request to shift gears of the transmission, determining whether to realize the predicted requested torque reduction amount by reducing motor torque or applying counter torque, as a result of the determining, when it is not possible to realize the predicted requested torque reduction amount, determining an operating point correction amount for increasing an available torque reduction amount of the motor, and determining whether to perform first gear-shifting control in consideration of efficiency of the first gear-shifting control of increasing the motor torque and reducing engine torque by the operating point correction amount before an actual requested torque reduction amount is input.

20 Claims, 8 Drawing Sheets

(51) Int. Cl.
*B60K 6/24* (2007.10)
*B60K 6/28* (2007.10)
*B60W 50/00* (2006.01)

HYBRID VEHICLE AND METHOD OF CONTROLLING GEAR SHIFTING FOR THE SAME

CROSS-REFERENCE TO RELATED APPLICATIONS

This application claims the benefit of Korean Application No. 10-2019-0163353, filed on Dec. 10, 2019, which application is hereby incorporated herein by reference.

TECHNICAL FIELD

The present disclosure relates to a hybrid vehicle and a method of controlling gear shifting for the same.

BACKGROUND

Recently, with the continued demand for improvement of fuel efficiency of vehicles and increasingly stringent regulations on vehicle emissions in many countries, the demand for environmentally friendly vehicles has increased. As practical representatives thereof, hybrid electric vehicles (HEVs) and plug-in hybrid electric vehicles (PHEVs) have been developed.

A hybrid vehicle runs using two power sources, namely an engine and a motor. In the case of harmonious operation of the engine and the motor, optimal output and torque may be generated. Specifically, in the case of a hybrid vehicle equipped with a parallel-type or TMED-type (Transmission-Mounted-Electric-Device-type) hybrid system, in which an electric motor and an engine clutch (EC) are installed between an engine and a transmission, the output of the engine and the output of the motor may be simultaneously transmitted to a driving shaft.

Typically, in the initial acceleration stage, a hybrid vehicle runs using electrical energy (i.e. an EV mode). However, there is a limitation on the amount of power capable of being provided in response to a request from a driver using only electrical energy, and there is thus a need to use an engine as a main power source (i.e. an HEV mode) at certain moments. At such times, when the difference between the number of revolutions per minute of the motor and the number of revolutions per minute of the engine is within a predetermined range, the hybrid vehicle operates such that an engine clutch is engaged so that the motor and the engine rotate together.

SUMMARY

The present disclosure relates to a hybrid vehicle and a method of controlling gear shifting for the same. Particular embodiments relate to a hybrid vehicle and a control method thereof for minimizing fuel loss due to gear-shifting intervention.

Accordingly, embodiments of the present disclosure provide a method of more effectively performing gear shifting intervention control in a hybrid vehicle and a vehicle for performing the method.

In particular, embodiments of the present disclosure provide a gear-shifting control method and a vehicle for performing the same for determining an intervention method in consideration of energy consumption when power is redistributed based on prediction of a gear shifting intervention magnitude in a hybrid vehicle.

Technical problems solved by the embodiments are not limited to the above technical problems and other technical problems which are not described herein will become apparent to those skilled in the art from the following description.

A method of controlling gear shifting of a hybrid vehicle including an engine, a motor, and a stepped transmission, includes predicting a requested torque reduction amount requested by the engine and the motor when there is a request to shift gears of the stepped transmission, determining whether to realize the predicted requested torque reduction amount by reducing motor torque or applying counter torque, as a result of the determining, when it is not possible to realize the predicted requested torque reduction amount, determining an operating point correction amount for increasing an available torque reduction amount of the motor, and determining whether to perform first gear-shifting control in consideration of efficiency of the first gear-shifting control of increasing the motor torque and reducing engine torque by the operating point correction amount before an actual requested torque reduction amount is input.

In another embodiment of the present disclosure, a hybrid vehicle including an engine, a motor, and a stepped transmission includes a transmission controller configured to determine whether gear shifting of the stepped transmission is required, and a hybrid controller configured to predict a requested torque reduction amount requested by the engine and the motor when there is a request to shift gears from the transmission controller, to determine whether to realize the predicted requested torque reduction amount by reducing motor torque or applying counter torque, as a result of the determining, when it is not possible to realize the predicted requested torque reduction amount, to determine an operating point correction amount for increasing an available torque reduction amount of the motor, and to determine whether to perform first gear-shifting control in consideration of efficiency of the first gear-shifting control based on the determined operating point correction amount, wherein the first gear-shifting control is performed by increasing the motor torque and reducing engine torque by the operating point correction amount before an actual requested torque reduction amount is input.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF ILLUSTRATIVE EMBODIMENTS

Figure 1:
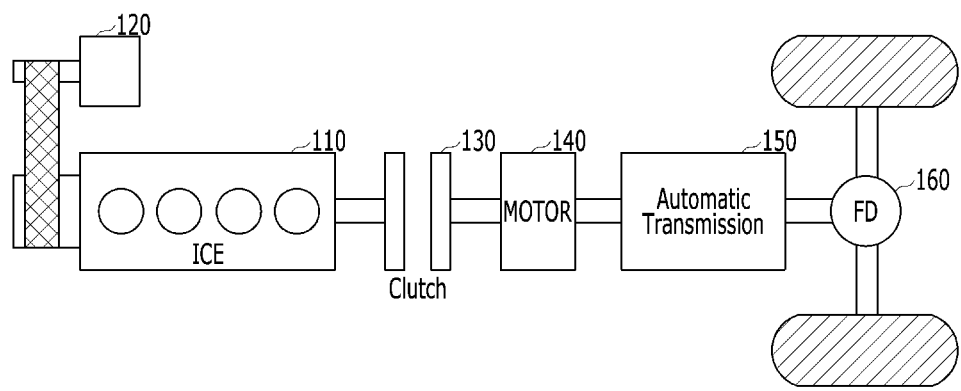
FIG. 1 illustrates an exemplary structure of a powertrain of a general hybrid vehicle.

Hereinafter, the embodiments of the present disclosure will be described in detail with reference to the accompanying drawings so as to be easily implemented by those skilled in the art. However, the present disclosure may be variously implemented, and is not limited to the embodiments described herein. In the drawings, in order to clearly describe the present disclosure, portions which are not related to the description of the present disclosure will be omitted, and similar portions are denoted by similar reference numerals throughout the specification.

Throughout the specification, when a certain portion is said to "include" a certain component, this does not indicate that other components are excluded, and the same may be further included unless specifically described to the contrary. The same reference numbers will be used throughout the drawings to refer to the same or like parts.

The structure of the hybrid vehicle will be described below with reference to FIG. 1.

FIG. 1 illustrates an exemplary structure of a powertrain of a general hybrid vehicle.

Referring to FIG. 1, the powertrain of the hybrid vehicle adopts a parallel-type hybrid system, in which an electric motor (or a drive motor) 140 and an engine clutch 130 are mounted between an internal combustion engine (ICE) 110 and a transmission 150.

Typically, when a driver presses an accelerator after starting the vehicle (i.e. the accelerator pedal position sensor on mode), the motor 140 is first driven using the electric power of a battery in the state in which the engine clutch 130 is opened, and wheels are moved by the power transferred to a final drive (FD) 160 via the transmission 150 from the motor (i.e. an EV mode). When a greater driving force is required due to the gradual acceleration of the vehicle, the ICE 110 may be driven by operating an auxiliary motor (or a starter/generator motor) 120.

Thus, when the number of revolutions per minute of the ICE 110 and the number of revolutions per minute of the motor 140 are equal to each other, the vehicle is driven by both the ICE 110 and the motor 140 (i.e. transition from the EV mode to an HEV mode). When a predetermined engine off condition, such as the deceleration of the vehicle, is satisfied, the engine clutch 130 is opened and the ICE 110 is stopped (i.e. transitioning from the HEV mode to the EV mode). In this case, a battery 170 is charged through the motor 140 using the driving force of the wheels in the vehicle, which is referred to as braking energy regeneration or regenerative braking. Accordingly, the starter/generator motor 120 serves as a starter motor when the engine is started, and also serves as a generator when the rotational energy of the engine is recovered after the vehicle is turned on or when the vehicle is turned off. Therefore, the starter/generator motor 120 may be referred to as a hybrid starter generator (HSG).

In general, the transmission 150 is a stepped transmission or a multiple-plate clutch, e.g., a dual-clutch transmission (DCT), and performs upshifting to a second stage depending on the speed. When the transmission 150 shifts gears, in particular, during upshifting, a vehicle performs control of lowering the kinetic energy of a transmission input shaft, i.e., the speed thereof, by reducing the torque of a driving source for smooth gear shifting and protection of a clutch, and control in this regard is referred to as "intervention control". In a general vehicle, the torque of an engine needs to be reduced for intervention control, in which case air flow control and firing angle control may be considered, as will be described below.

First, air flow control refers to a method of adjusting the amount of air and fuel currently being introduced in order to control output torque. The present control method advantageously enhances ignition efficiency via optimum firing angle control corresponding to the current air flow and fuel amount, but it is almost impossible to precisely control the introduced air flow and fuel amount to satisfy the requested torque due to the characteristics of fluid behavior, and accordingly, there is a limit to torque fluctuation responsiveness. As a result, the present control method has high efficiency but needs to be more robust to errors related to requested-torque tracking and response lag.

Firing angle control refers to a method in which efficiency is considered less for requested-torque tracking, and here, higher amounts of air and fuel than those required for an engine cylinder are first ensured (e.g., torque reserve) for achieving requested torque in consideration of the sluggish behavior of fluid. In the case of firing angle retardation of a spark plug to achieve required torque when excessive amounts of air and fuel are ensured, efficiency is degraded but torque precision and responsiveness are ensured.

As a result, generally, gear shift intervention control is embodied via firing angle control for rapid responsiveness of engine torque reduction. However, as described above, when firing angle control is performed, the amount of fuel that is injected is the same as during normal control, but engine output is lowered, and thus, there is a problem of lowered fuel efficiency. Irrespective of the control method for reducing engine torque, engine torque is lowered by gear shift intervention control and wheel torque is also lowered and, thus, there is a problem in that a passenger inevitably senses the variation in torque when shifting gears.

However, in the case of a hybrid vehicle, negative torque is applied to the electric motor 140 in order to reduce the torque of a driving source, and in this case, the electric motor 140 generates electricity, as will be described with reference to FIG. 2.

Figure 2:
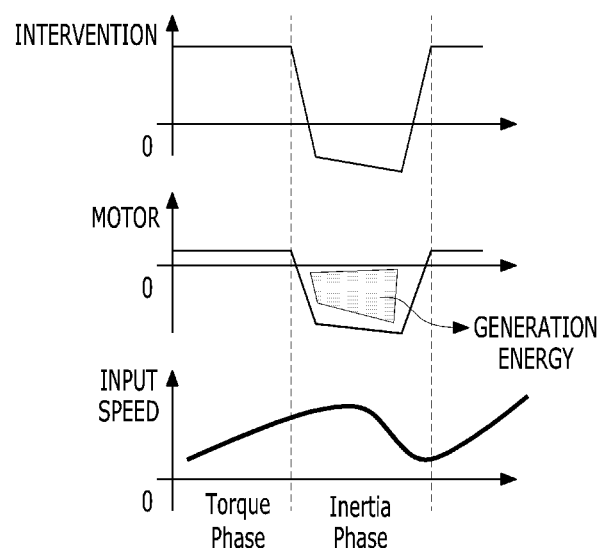
FIG. 2 is a diagram showing an example of an intervention procedure for upshift in a general vehicle.

FIG. 2 is a diagram showing an example of an intervention procedure for upshift in a general vehicle.

FIG. 2 shows three graphs, and here, the vertical axis indicates intervention, the torque of an electric motor, and speed of a transmission input shaft, from top to bottom.

A gear-shifting procedure is broadly classified into a torque phase and an inertia phase, and here, the torque phase is a phase in which the speed of an input shaft is increased. The inertia phase refers to a phase in which the torque of an input shaft is reduced and the speed of the input shaft is reduced, and refers to a phase in which intervention is performed to a corresponding degree when a controller for controlling a transmission makes a request for an actual intervention magnitude. In addition, application of negative (−) torque to an electric motor refers to the generation of electricity. Thus, the power generated via electricity generation by the electric motor may be used to charge a battery.

However, depending on the case, there is a problem in that an intervention magnitude is not satisfied using only an electric motor, which will be described with reference to FIG. 3.

Figure 3:
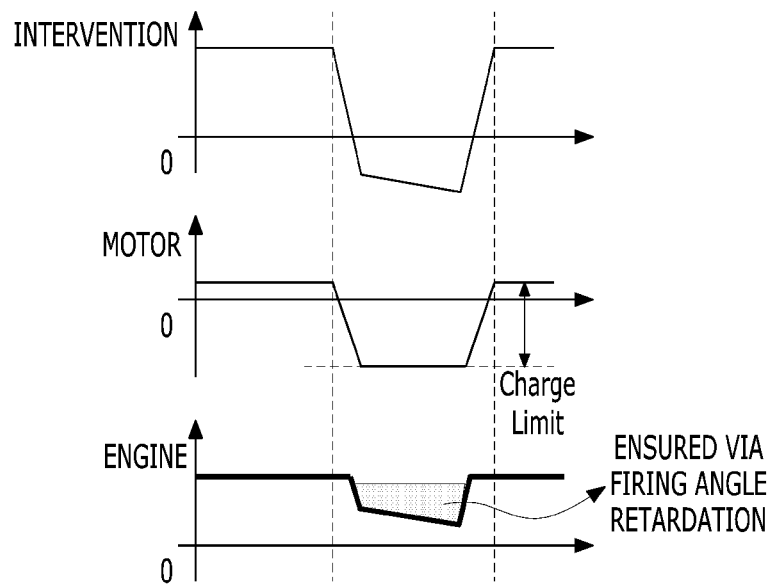
FIG. 3 illustrates an example of a problem that occurs in an intervention procedure in a general hybrid vehicle.

FIG. 3 illustrates an example of a problem that occurs in an intervention procedure in a general hybrid vehicle.

Referring to FIG. 3, an intervention magnitude that an electric motor is capable of providing is the sum of the current torque and counter torque corresponding to a charge limit, and when the intervention requirement (upper graph) exceeds the intervention magnitude that the electric motor is capable of bearing, an additional intervention magnitude needs to be satisfied through an engine (i.e., firing angle retardation). However, as described above, there is a problem in that firing angle retardation degrades fuel efficiency.

In order to overcome the problem, provided is a method of predicting an intervention magnitude before gear shift occurs and redistributing torque in a powertrain according to the prediction result, which will be described with reference to FIG. 4.

Figure 4:
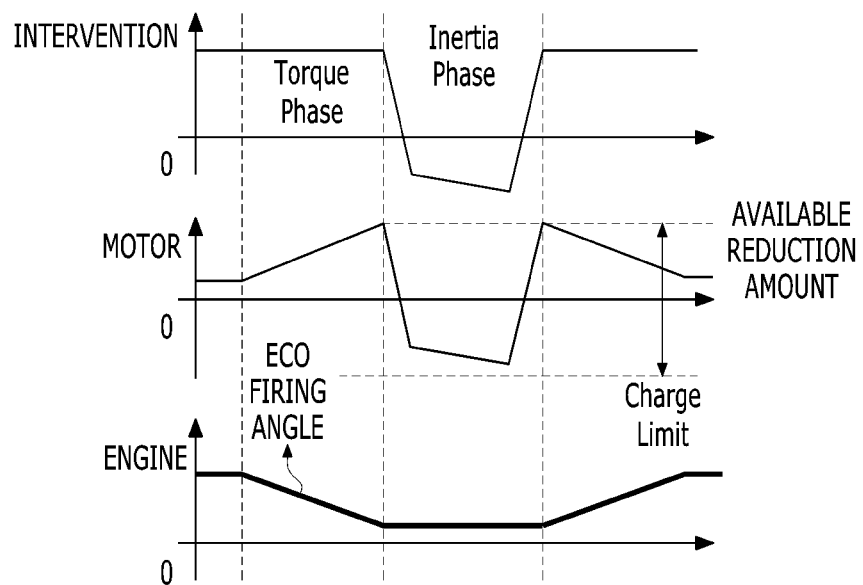
FIG. 4 is a diagram showing an example of torque redistribution through prediction of an intervention magnitude.

FIG. 4 is a diagram showing an example of torque redistribution through prediction of an intervention magnitude.

Referring to FIG. 4, the intervention magnitude is predicted, but when it is determined that the intervention magnitude is not capable of being provided only by a motor in consideration of the current operation state of a motor, i.e., the output torque, the torque of an electric motor is increased in advance due to a shortage in a torque phase, and in this case, the torque of an engine is lowered by the increased torque of the electric motor. This is because the total torque needs to be maintained by lowering the engine torque by the increase in the torque of the electric motor. In this case, the torque of an engine is lowered during the torque phase, and thus it is not required to recognize a sharp firing angle. Accordingly, an air flow control method characterized by only a slight reduction in fuel efficiency may be applied.

However, when the method shown in FIG. 4 is applied, firing angle recognition control is obviated, but, depending on the cases, it may be more disadvantageous than firing angle recognition control in terms of fuel efficiency, which will be described with reference to FIGS. 5A and 5B.

Figure 5A:
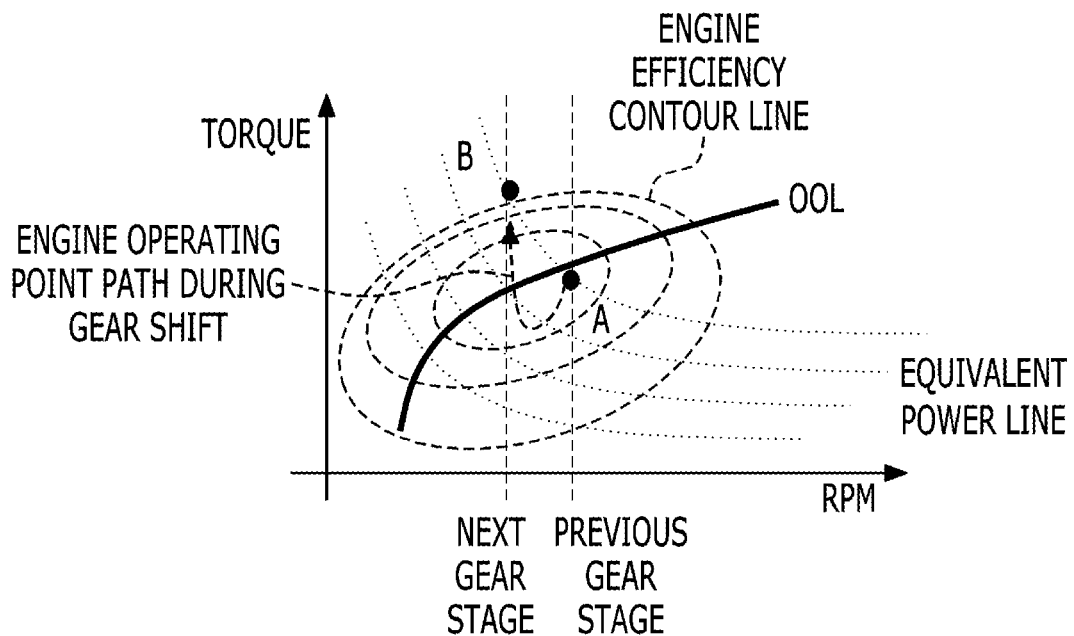
FIGS. 5A and 5B show a change in an engine operating point before and after gear shifting, respectively.
Figure 5B:
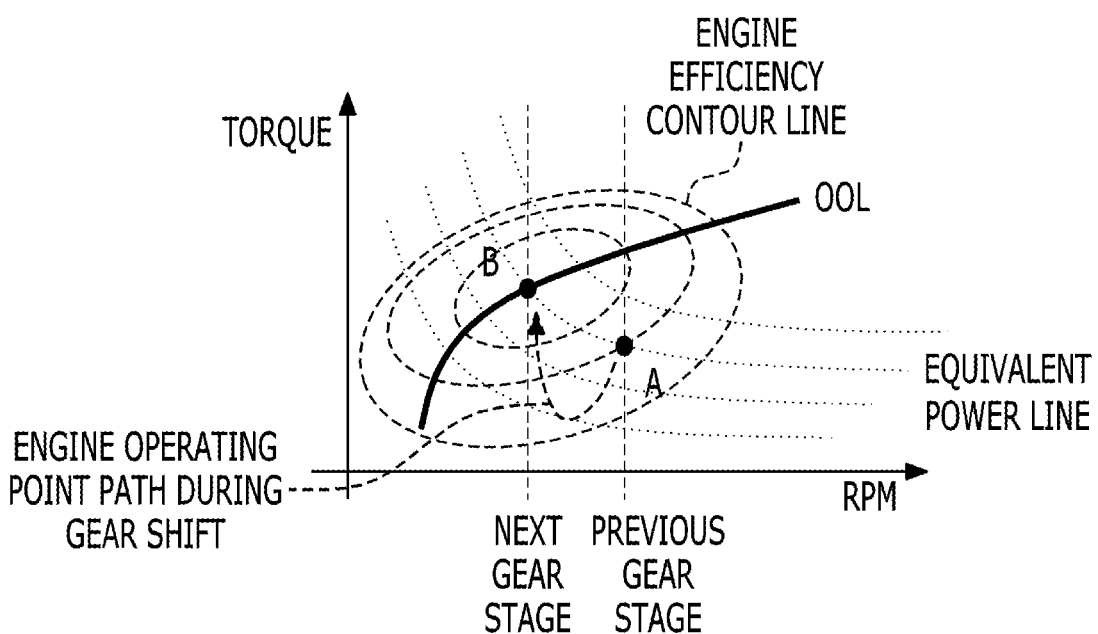

FIGS. 5A and 5B show a change in an engine operating point before and after gear shifting, respectively.

FIG. 5A shows the case in which an engine operating point is formed around an optimal operating line (OOL) before gear shifting and FIG. 5B shows the case in which an engine operating point is formed below the OOL before gear shifting. However, common throughout FIGS. 5A and 5B, required power is maintained before and after gear shifting, in which case it is assumed that the operating point B after gear shifting is lowered in RPM and is increased in torque (e.g., upshift) compared with the operating point A before gear shifting.

First, referring to FIG. 5A, a transition path to the operating point B after gear shifting from the operating point A before gear shifting due to the reduction in engine torque during gear shifting stays around the OOL, and thus engine efficiency is not greatly lowered.

In contrast, in FIG. 5B, the transmission path to the operating point B after gear shifting from the operating point A before gear shifting due to reduction in engine torque during gear shifting departs from the OOL, and thus there is a problem in that, when intervention is performed, engine efficiency is greatly degraded.

As a result, when intervention is performed as shown in FIG. 4, engine efficiency is lowered depending on an operating point, power consumption occurs along with an increase in the torque of a motor in a torque phase, and power consumption is also accompanied by path loss, and thus there is a problem in that actual energy loss is higher than in the firing angle recognition method shown in FIG. 3.

Prior to the description of a method of controlling gear shifting according to an embodiment of the present disclosure, the relationship between a powertrain and a controller to which the present embodiments are applicable will be described with reference to FIG. 6. The configuration of FIG. 6 may be applied to a hybrid vehicle including the aforementioned powertrain configuration of FIG. 1.

Figure 6:
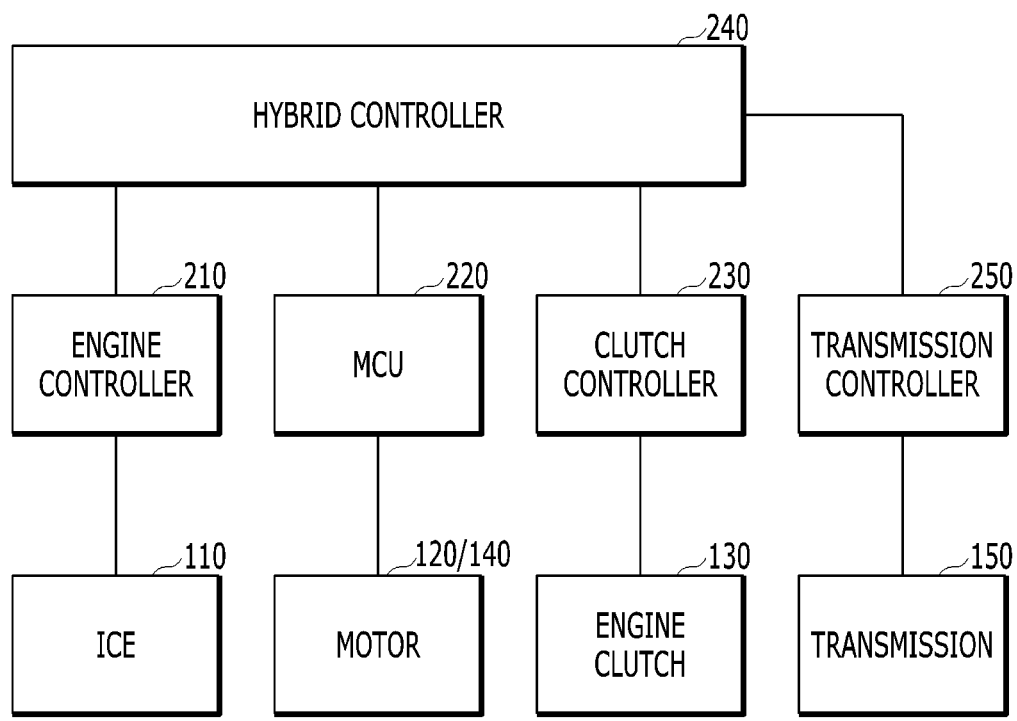
FIG. 6 is a block diagram showing an example of a control system of a hybrid vehicle to which embodiments of the present disclosure are applicable.

FIG. 6 is a block diagram showing an example of a control system of a hybrid vehicle to which embodiments of the present disclosure are applicable.

Referring to FIG. 6, in the hybrid vehicle to which embodiments of the present disclosure are applicable, an internal combustion engine (ICE) 110 may be controlled by an engine controller 210, the torque of a starter/generator motor 120 and an electric motor 140 may be controlled by a motor control unit (MCU) 220, and an engine clutch 130 may be controlled by a clutch controller 230. Here, the engine controller 210 may also be referred to as an engine management system (EMS). The transmission 150 may be controlled by a transmission controller 250. As necessary, the starter/generator motor 120 and the motor 140 may be controlled by different separate motor controllers.

Each controller may be connected to a hybrid controller 240 for controlling the overall operation of a powertrain as a high-level controller in a hybrid vehicle and may provide information required to switch driving modes and to control an engine clutch during gear shifting, and/or information required to control engine off to the hybrid controller 240, or may perform an operation according to a control signal under control of the hybrid controller 240.

In more detail, the hybrid controller 240 may determine whether a mode is switched depending on the driving state of a vehicle. For example, the hybrid controller may determine the open time of the engine clutch (EC) 130, and may control hydraulic pressure (in the case of a wet EC) or control torque capacity (in the case of a dry EC) when the EC is opened. The hybrid controller 240 may determine an EC state (lock-up, slip, open, etc.), and may control the time for stoppage of fuel injection of the ICE 110. In addition, the hybrid controller may transmit a torque command for control of torque of the starter/generator motor 120 to the MCU 220 to control engine off, and may control engine rotational energy recovery. The hybrid controller 240 may learn past travel data and may calculate DTE (distance to empty) information depending on a battery state of charge (SoC) by applying current travel data.

Needless to say, it will be obvious to those of ordinary skill in the art that the aforementioned relationships between the controllers and functions/divisions of the controllers are exemplary and, thus the disclosure is not limited thereto. For example, the hybrid controller 240 may be embodied such that any one of other controllers other than the hybrid controller 240 provides the corresponding function, or two or more other controllers may distribute and provide the corresponding function.

Hereinafter, a method of controlling gear shifting according to an embodiment of the present disclosure will be described based on the aforementioned configuration of a vehicle.

An embodiment of the present disclosure provides a method of comparing energy consumption between control of increasing motor torque in advance while reducing engine torque in a torque phase and firing angle recognition control, selecting the more efficient method, and performing intervention when it is determined that an intervention magnitude is not capable of being provided using only a motor by predicting the intervention magnitude before gear shifting.

In the following description, for convenience, as shown in FIG. 4, control for increasing motor torque in advance and increasing an intervention magnitude to be provided by a motor while reducing engine torque in a torque phase will be referred to as "eco intervention". According to embodiments of the present disclosure, the transmission 150 is assumed to be a stepped transmission (including a DCT) of which a gear stage is physically divided and that requires intervention during a gear-shifting procedure.

Figure 7:
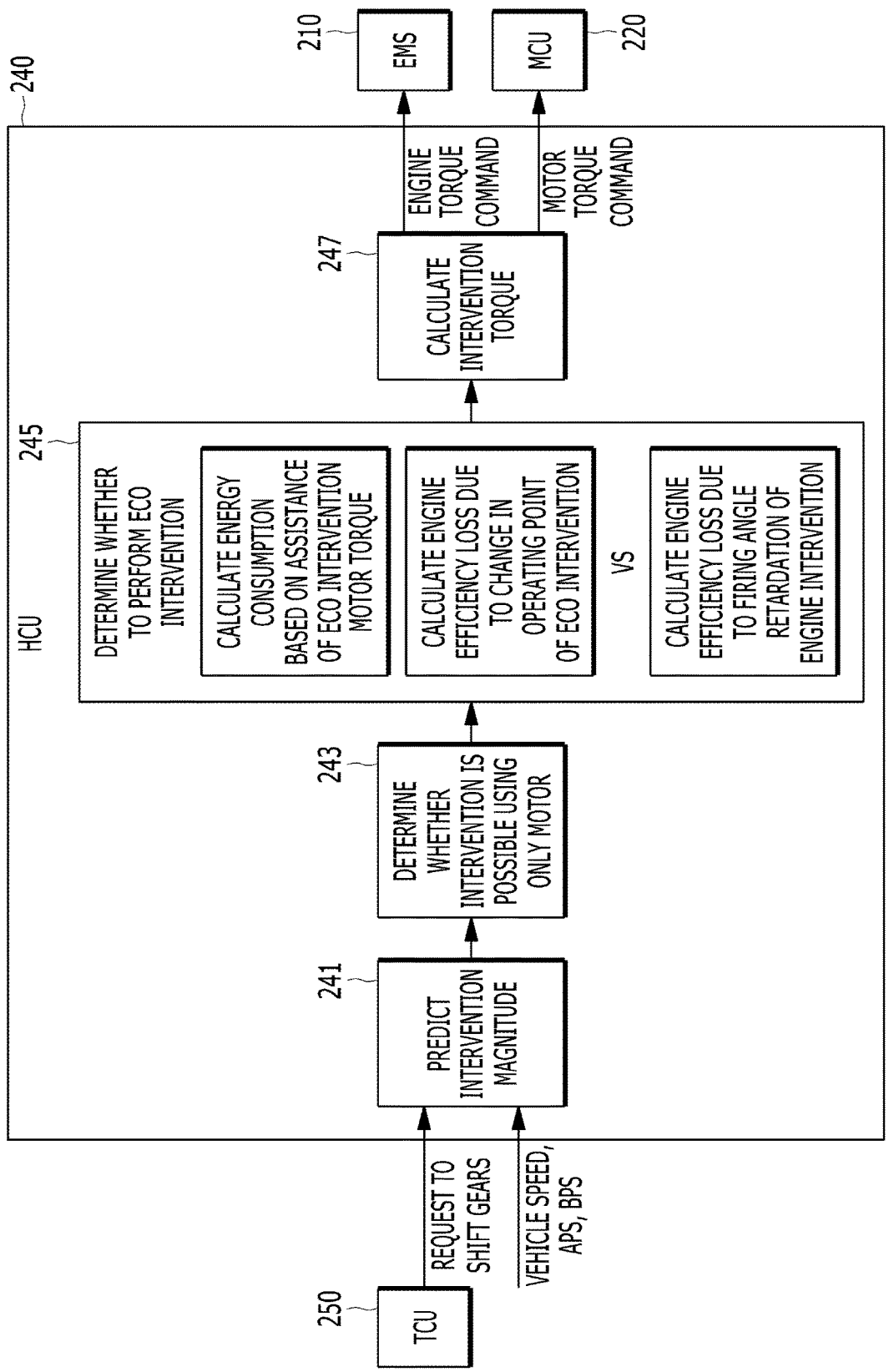
FIG. 7 is a diagram showing an example of the configuration of a hybrid controller to which an embodiment of the present disclosure is applicable.

FIG. 7 is a diagram showing an example of the configuration of a hybrid controller to which an embodiment of the present disclosure is applicable.

Referring to FIG. 7, a hybrid controller 240 according to an embodiment may include an intervention magnitude predictor 241 for predicting an intervention magnitude, a motor intervention determiner 243 for determining whether the intervention magnitude predicted by the intervention magnitude predictor 241 is capable of being provided using only a motor, an eco intervention determiner 245 for comparing energy consumption between eco intervention control and firing angle retardation control and determining whether eco intervention is to be performed, and an intervention torque calculator 247 for calculating engine torque and motor torque for intervention depending on the form of the intervention determined by the eco intervention determiner 245.

Figure 8:
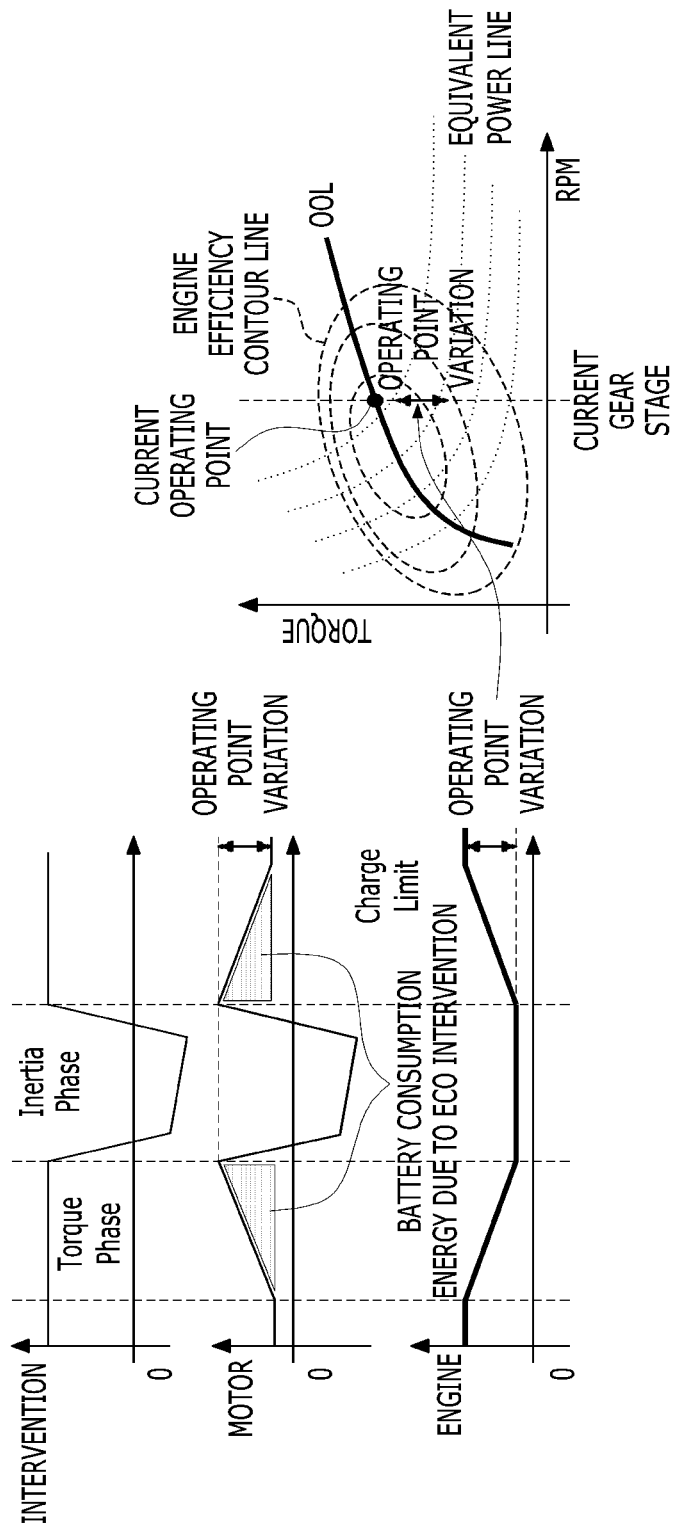
FIG. 8 is a diagram showing an example of the form of eco intervention according to an embodiment of the present disclosure.

The functions of components of the hybrid controller 240 and the form of intervention control will be described with reference to the drawings along with FIG. 8. FIG. 8 is a diagram showing an example of the form of eco intervention according to an embodiment of the present disclosure.

First, when there is a request to shift gears from the transmission controller 250, the intervention magnitude predictor 241 may acquire information on a target gear stage, a gear shift phase, a gear shift class, or the like from the transmission controller 250 and may predict intervention magnitude based on information on current requested torque, vehicle speed, or the like. Here, the gear shift phase may refer to a procedure in which gear shifting proceeds in an automatic transmission, and generally, the gear shift phase includes about 10 phases, but the present embodiment is not limited with regard to the configuration of the gear shift phase. The gear shift class refers to a parameter indicating the characteristics of gear shifting that is currently being performed. For example, the gear shift class may include power-on upshift, power-off downshift, or the like, but is not limited thereto.

The motor intervention determiner 243 may compare the intervention magnitude predicted by the intervention magnitude predictor 241 and an available motor reduction amount (i.e., corresponding to the difference between the motor torque and the charge limit in FIG. 3), and may determine whether the intervention magnitude is capable of being provided using only a motor. That is, the motor intervention determiner 243 may determine that intervention is possible using only a motor in the case where "(predicted intervention magnitude)<=(available motor reduction amount)" is true.

When it is determined that the entire intervention magnitude is capable of being provided using only a motor, the eco intervention determiner 245 may calculate an operating point correction amount (i.e., an operating point variation of FIG. 8) in a torque phase assuming that eco intervention is to be performed. In this case, the operating point correction amount may be a shortage in the available intervention magnitude of a motor (i.e., operating point correction amount=predicted intervention magnitude−available motor reduction amount, where the available motor reduction amount is an amount obtained by subtracting the charge limit from the current motor torque).

When the operating point correction amount is calculated, the eco intervention determiner 245 may determine energy consumption during eco intervention control. The energy consumption during eco intervention control may be the sum of battery energy consumed to increase motor torque by the operating point correction amount and fuel energy consumed during a control period.

First, the battery energy consumption that is consumed by a motor to increase the operating point correction amount from the original torque may correspond to the area (battery energy consumption by eco intervention) indicated after and before an inertia phase in an intermediate graph of a left side of FIG. 8.

The amount of fuel consumed by an engine depending on the operating point correction amount may be obtained by integrating the product of brake specific fuel consumption (BSFC) and engine output power during an entire control period (i.e., "∫ BSFC (rpm, corrected operating point torque) *engine output power dt").

The eco intervention determiner 245 may obtain the amount of fuel that is consumed when intervention is performed through reduction in engine torque (e.g., firing angle retardation) without a change in the available intervention magnitude of a motor (i.e., no correction of operating point). When there is no correction of an operating point, the fuel amount consumed in an engine may be obtained by integrating the product of the BSFC and the engine output power during the entire control period (i.e., "∫ BSFC (rpm, original operating point torque)*engine output power dt").

When energy consumption is acquired using two different intervention methods, the eco intervention determiner 245 may compare the two energy consumption amounts. Here, in the case of eco intervention, battery energy consumption may be converted into fuel consumption by multiplying the battery energy consumption by a fuel/battery equivalent coefficient. The fuel/battery equivalent coefficient may be set depending on the efficiency characteristics of an engine and a motor. As a result, the eco intervention determiner 245 may compare "(battery energy consumption*fuel/battery equivalent coefficient)+amount of fuel consumed during correction of operating point" with the amount of fuel that is consumed when there is no correction of an operating point, may determine to perform eco intervention when the amount of fuel that is consumed when there is no correction of the operating point is greater, and may determine to perform intervention without correcting the operating point otherwise.

When the eco intervention determiner 245 determines to perform eco intervention, the intervention torque calculator 247 may distribute torque so as to increase motor torque and to reduce engine torque by the operating point correction amount in a torque phase. In this case, a reduction in engine torque may be performed through air flow control for efficiency, in which case the engine torque may be increased and reduced at a predetermined ratio in consideration of responsiveness. Then, in an inertia phase, the intervention torque calculator 247 may provide an actual requested intervention magnitude received from the transmission controller 250 as motor torque and may compensate for a shortage through firing angle retardation of an engine when the actual requested amount is greater than the intervention magnitude predicted by the intervention magnitude predictor 241.

When gear shifting is completed, the intervention torque calculator 247 may release correction of an operating point and may restore the torque of each of a motor and an engine to the original operating point thereof.

Needless to say, when the eco intervention determiner 245 determines not to perform eco intervention, the intervention torque calculator 247 may not correct an operating point in a torque phase, may distribute torque corresponding to an available reduction amount of a motor in an inertia phase, and may distribute compensation of a shortage in intervention to an engine.

Figure 9:
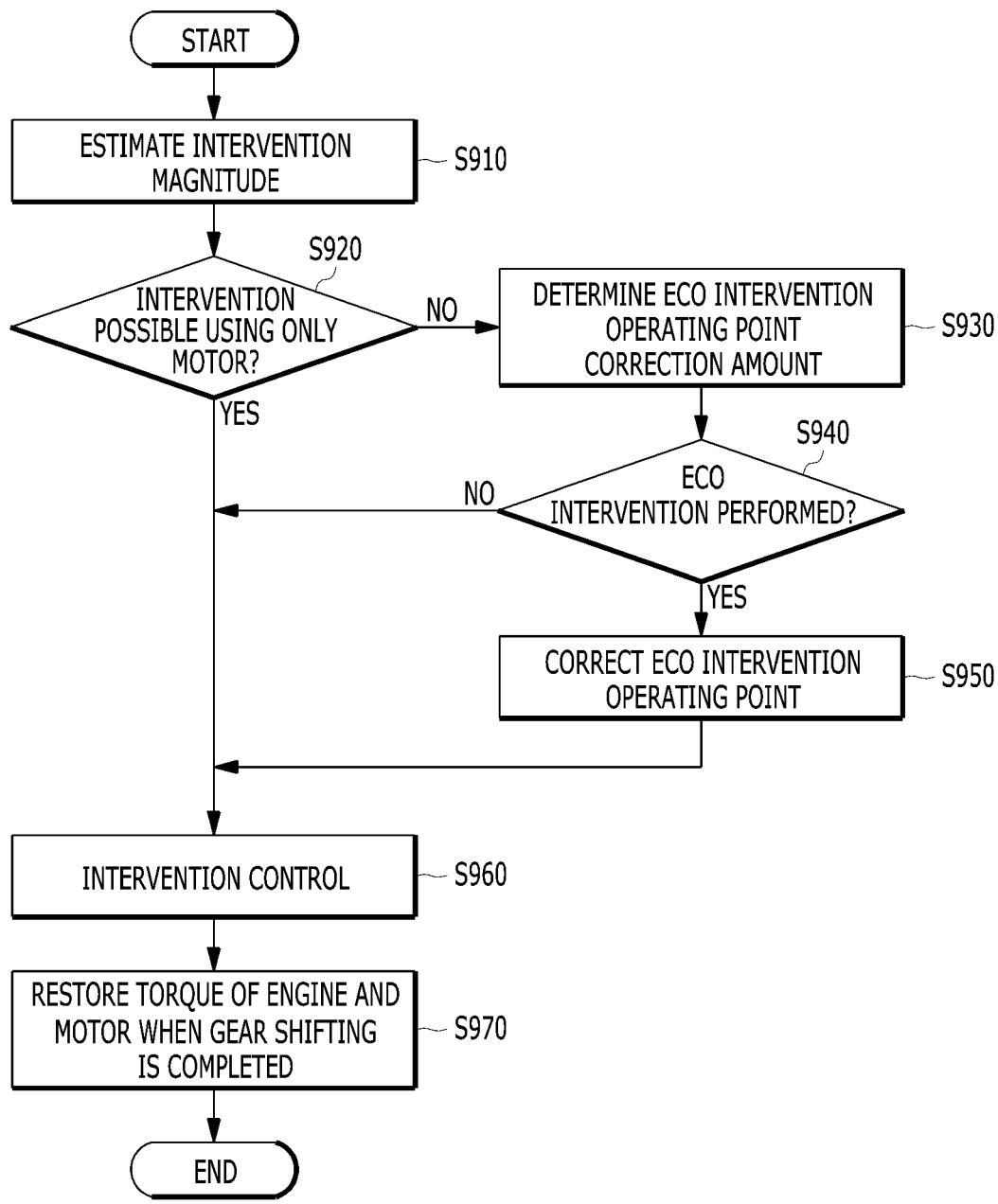
FIG. 9 is a flowchart showing an example of a procedure of controlling gear shifting according to an embodiment of the present disclosure.

A flowchart obtained by summarizing the procedure of controlling gear shifting described thus far is shown in FIG. 9.

FIG. 9 is a flowchart showing an example of a procedure of controlling gear shifting according to an embodiment of the present disclosure.

Referring to FIG. 9, first, when there is a request to shift gears from the transmission controller 250, the hybrid controller 240 may estimate an intervention magnitude based on a target gear stage, a gear shift phase, a gear shift class, an accelerator pedal sensor (APS) value, a vehicle speed, a current gear stage, or the like (S910).

The hybrid controller 240 may determine whether the intervention magnitude is capable of being provided using only a motor based on the estimated intervention magnitude (i.e., the predicted intervention magnitude) (S920), and when the predicted intervention magnitude is greater than the available motor reduction amount (i.e., NO of S920), the hybrid controller 240 may subtract the available motor reduction amount from the predicted intervention magnitude to determine the operating point correction amount for eco intervention (S930).

Then, the hybrid controller 240 may compare energy consumption with energy consumption during intervention without correction of an operating point based on the determined operating point correction amount, and may determine whether eco intervention is to be performed (S940).

When the hybrid controller 240 determines to perform eco intervention because energy consumption during intervention without correction of an operating point is greater (YES of S940), the hybrid controller 240 may correct the operating point of a motor and an engine by a correction amount in a torque phase (S950).

Then, in an inertia phase, the hybrid controller 240 may first reduce a motor torque by the requested intervention magnitude transmitted by the transmission controller 250, and as necessary, may also additionally reduce an engine torque via firing angle control (S960).

When gear shifting is completed, the hybrid controller 240 may restore the torque of the engine and the motor (S970).

Figure 10:
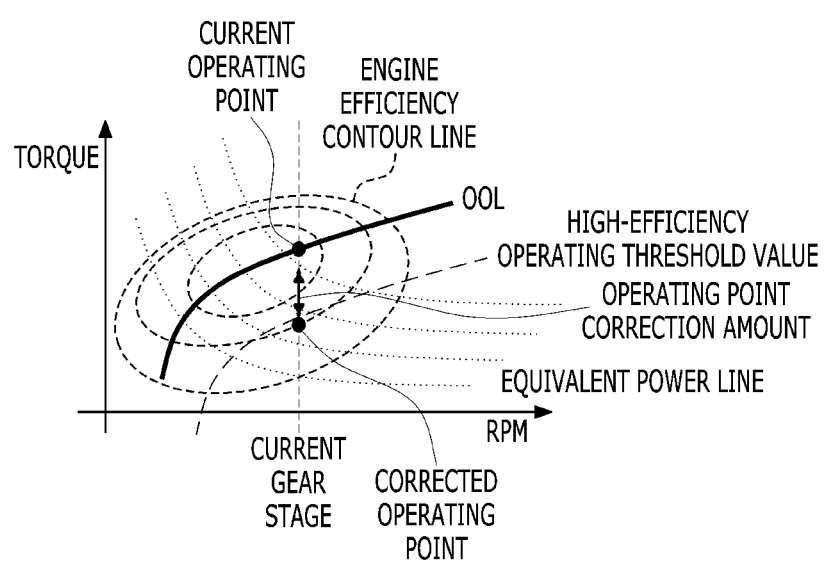
FIG. 10 is a diagram for explaining a high-efficiency operating threshold value according to another embodiment of the present disclosure.

In the aforementioned embodiment, energy consumption in eco intervention with correction of an operating point and energy consumption without correction of an operating point may be calculated and compared with each other, but according to another embodiment, whether to perform eco intervention may be determined (i.e., corresponding to operation S940 of FIG. 9) by determining whether a corrected operating point is greater than a high-efficiency operating threshold value for achieving a preset minimum engine efficiency, which will be described with reference to FIG. 10.

FIG. 10 is a diagram for explaining a high-efficiency operating threshold value according to another embodiment of the present disclosure.

Referring to FIG. 10, a corrected operating point may be a value obtained by subtracting the operating point correction amount from the current engine operating point, and the high-efficiency operating threshold value may be set in the form obtained by subtracting a predetermined margin torque from an OOL. In the situation shown in FIG. 10, the corrected operating point is equal to or less than a high-efficiency operating threshold value, and thus the hybrid controller 240 may determine to perform intervention without correction of an operating point, rather than performing eco intervention.

According to the aforementioned embodiments of the present disclosure, a reduction in engine efficiency and path loss due to motor use during a procedure of avoiding engine intervention through engine firing angle control may be minimized, and thus gear-shifting efficiency may also be increased under various operating conditions, thereby increasing fuel efficiency.

A hybrid vehicle related to at least one embodiment of the present disclosure as configured above may effectively control gear shifting.

In particular, when intervention is not possible using only a motor via prediction of an intervention magnitude before gear shifting, energy consumption when performing control of increasing motor torque in advance and energy consumption when performing firing angle recognition control may be compared, and the more efficient method may be selected, thereby enhancing efficiency.

It will be appreciated by persons skilled in the art that the effects that could be achieved with the present disclosure are not limited to what has been particularly described hereinabove and other advantages of the present disclosure will be more clearly understood from the detailed description.

The invention can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, and optical data storage devices.

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method of controlling gear shifting of a hybrid vehicle comprising an engine, a motor, and a stepped transmission, the method comprising:
predicting a requested torque reduction amount requested by the engine and the motor when there is a request to shift gears of the stepped transmission;
determining whether to realize the predicted requested torque reduction amount by reducing motor torque or applying counter torque;
as a result of the determining, when it is not possible to realize the predicted requested torque reduction amount, determining an operating point correction amount for increasing an available torque reduction amount of the motor; and determining whether to perform first gear-shifting control in consideration of efficiency of the first gear-shifting control of increasing the motor torque and reducing engine torque by the operating point correction amount before an actual requested torque reduction amount is input.

2. The method of claim 1, wherein determining whether to perform the first gear-shifting control comprises:

determining a first energy to be consumed during a gear-shifting procedure via the first gear-shifting control and a second energy to be consumed during a gear-shifting procedure via a second gear-shifting control in which the operating point correction amount is not applied to the engine torque and the motor torque; and determining whether to perform the first gear-shifting control or the second gear-shifting control depending on magnitudes of the first energy and the second energy.

3. The method of claim 2, wherein:

the first energy comprises a battery energy consumption required to increase the motor torque by the operating point correction amount during a gear-shifting procedure via the first gear-shifting control and a first engine fuel consumption consumed during the gear-shifting procedure; and the second energy comprises a second engine fuel consumption consumed during a gear-shifting procedure via the second gear-shifting control.

4. The method of claim 3, wherein determining whether to perform the first gear-shifting control or the second gear-shifting control comprises comparing a value obtained by summing a value converted into fuel consumption by multiplying the battery energy consumption by an equivalent coefficient, and the first engine fuel consumption with a magnitude of the second engine fuel consumption.

5. The method of claim 1, wherein determining whether to perform the first gear-shifting control comprises:

comparing a value obtained by subtracting the operating point correction amount from a current engine torque with a preset threshold value; and when the value obtained by subtracting the operating point correction amount from the current engine torque is greater than the preset threshold value, determining to perform the first gear-shifting control.

6. The method of claim 5, wherein the preset threshold value is set by subtracting a predetermined margin from an optimal operating line for the engine.

7. The method of claim 1, wherein determining the operating point correction amount comprises:

subtracting a current available torque reduction amount of the motor from the predicted requested torque reduction amount, wherein the current available torque reduction amount corresponds to a sum of a current torque of the motor and a counter torque value corresponding to a charge limit.

8. The method of claim 1, further comprising when the first gear-shifting control is determined to be performed, reducing the engine torque by the operating point correction amount in a gear shift phase before the actual requested torque reduction amount is input.

9. The method of claim 8, wherein reducing the engine torque is performed to realize a predetermined variation ratio through air flow control.

10. The method of claim 1, wherein predicting the requested torque reduction amount is performed based on at least one of a target gear stage, a gear shift phase, a gear shift class, a current requested torque, or a vehicle speed.

11. A non-transitory computer-readable recording medium having recorded thereon a program for executing the method of claim 1.

12. A hybrid vehicle comprising:

an engine;

a motor;

a stepped transmission;

a transmission controller configured to determine whether gear shifting of the stepped transmission is required; and a hybrid controller configured:

to predict a requested torque reduction amount requested by the engine and the motor when there is a request to shift gears from the transmission controller;

to determine whether to realize the predicted requested torque reduction amount by reducing motor torque or applying counter torque;

when it is not possible to realize the predicted requested torque reduction amount, to determine an operating point correction amount for increasing an available torque reduction amount of the motor; and to determine whether to perform first gear-shifting control in consideration of efficiency of the first gear-shifting control based on the determined operating point correction amount, wherein the first gear-shifting control is configured to be performed by increasing the motor torque and reducing engine torque by the operating point correction amount before an actual requested torque reduction amount is input.

13. The hybrid vehicle of claim 12, wherein the hybrid controller is configured:

to determine a first energy to be consumed during a gear-shifting procedure via the first gear-shifting control and a second energy to be consumed during a gear-shifting procedure via a second gear-shifting control in which the operating point correction amount is not applied to the engine torque and the motor torque; and to determine whether to perform the first gear-shifting control or the second gear-shifting control depending on magnitudes of the first energy and the second energy.

14. The hybrid vehicle of claim 13, wherein:

the first energy comprises a battery energy consumption required to increase the motor torque by the operating point correction amount during a gear-shifting procedure via the first gear-shifting control and a first engine fuel consumption consumed during the gear-shifting procedure; and the second energy comprises a second engine fuel consumption consumed during a gear-shifting procedure via the second gear-shifting control.

15. The hybrid vehicle of claim 14, wherein the hybrid controller is configured:

to compare a value obtained by summing a value converted into fuel consumption by multiplying the battery energy consumption by an equivalent coefficient, and the first engine fuel consumption with a magnitude of the second engine fuel consumption; and to determine whether to perform the first gear-shifting control or the second gear-shifting control.

16. The hybrid vehicle of claim 12, wherein the hybrid controller is configured:

to compare a value obtained by subtracting the operating point correction amount from a current engine torque with a preset threshold value; and when the value obtained by subtracting the operating point correction amount from the current engine torque is greater than the preset threshold value, to determine to perform the first gear-shifting control.

17. The hybrid vehicle of claim 16, wherein the preset threshold value is set by subtracting a predetermined margin from an optimal operating line for the engine.

18. The hybrid vehicle of claim 12, wherein the hybrid controller is configured to determine the operating point correction amount by subtracting a current available torque reduction amount of the motor from the predicted requested torque reduction amount, wherein the current available torque reduction amount corresponds to a sum of a current torque of the motor and a counter torque value corresponding to a charge limit.

19. The hybrid vehicle of claim 12, wherein, when the first gear-shifting control is determined to be performed, the hybrid controller is configured to perform control to reduce the engine torque in a predetermined variation ratio through air flow control by the operating point correction amount in a gear shift phase before the actual requested torque reduction amount is input.

20. The hybrid vehicle of claim 12, wherein the hybrid controller is configured to predict the requested torque reduction amount based on at least one of a target gear stage, a gear shift phase, a gear shift class, a current requested torque, or a vehicle speed.

* * * * *